United States Patent
Vandervort

(10) Patent No.: US 9,424,576 B2
(45) Date of Patent: Aug. 23, 2016

(54) METHODS AND SYSTEMS OF CREATING A PAYMENT RECORD WITH A CRYPTOGRAPHICALLY SECURE AUDIT TRAIL

(71) Applicant: Xerox Corporation, Norwalk, CT (US)

(72) Inventor: David R. Vandervort, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/486,142

(22) Filed: Sep. 15, 2014

(65) Prior Publication Data

US 2016/0078433 A1 Mar. 17, 2016

(51) Int. Cl.
*H04L 9/32* (2006.01)
*G06Q 20/38* (2012.01)
*H04L 29/06* (2006.01)

(52) U.S. Cl.
CPC ........ *G06Q 20/3827* (2013.01); *H04L 63/0876* (2013.01)

(58) Field of Classification Search
CPC .................................................... H04L 9/3281
USPC ............................................................ 713/176
See application file for complete search history.

(56) References Cited

U.S. PATENT DOCUMENTS

| | | | |
|---|---|---|---|
| 7,487,128 B2* | 2/2009 | Spagna | G06F 21/10 705/51 |
| 7,689,900 B1* | 3/2010 | Fifield | G06F 21/645 382/115 |
| 8,528,097 B2* | 9/2013 | Ginter | G06F 21/6209 705/51 |
| 2008/0183826 A1* | 7/2008 | Notani | H04L 12/58 709/206 |
| 2012/0095877 A1* | 4/2012 | Ciudad | G06F 21/105 705/27.1 |

FOREIGN PATENT DOCUMENTS

WO    WO-02069290 A2    9/2002

OTHER PUBLICATIONS

New Site—hashcash.org, Binaries and Source, downloaded from internet: http://www.cypherspace.org/hashcash/, Sep. 11, 2014.

* cited by examiner

*Primary Examiner* — Teshome Hailu
(74) *Attorney, Agent, or Firm* — Fox Rothschild LLP

(57) ABSTRACT

A method of creating a secure audit trail for transactions may include, by a host electronic device, for each of a plurality of transactions, receiving, from a client electronic device, a transaction details document that summarizes the transaction, generating a document hash by performing a first cryptographic hash function on the received transaction details document, and identifying metadata associated with the transaction. The method may include generating an entry hash associated with the plurality of transactions by performing a second cryptographic hash function on at least the document hash of each transaction in the plurality of transactions and the metadata associated with each transaction in the plurality of transactions, and storing the entry hash in an entry in a transaction log database.

14 Claims, 6 Drawing Sheets

Cancel      Place Your Order
---

By placing your order, you agree to Company name.com's privacy notice and conditions of use.

Before you place your order:
Shop with Points allows customers to pay for Company Name.com purchases using credit card rewards. To see if you have rewards available or to change the rewards amount for this purchase, please go to the payment selection page.

```
                    Place Your Order
```

Order Summary
Items: 5.80
Shipping & handling: 0.00

Total before tax: 5.80
Estimated tax to be collected.* 0.00

Order total: 5.80

Shipping address
John Smith
123 Main Street
New York, NY 10000
United States
Phone: 212-555-5555

[ Change ]

FIG 4

User: 1
Merchant: Company Name.com
Currency: USD
Amount: 5.80
Pre approval: false
Transaction hash: 682e56b4139fccbe543db487c12fbd2c88bfcadad18d86e5cc831a4d12523896
Image hash: 30d7791ae97f583b30ea1117447 7eeeeaf7aebe83f222cd7f98188caa61290f99

FIG 6

METHODS AND SYSTEMS OF CREATING A PAYMENT RECORD WITH A CRYPTOGRAPHICALLY SECURE AUDIT TRAIL

BACKGROUND

With the increased use of connected devices, such as computers, laptops, smart phones, tablets, and the like, there is an ever growing number of ways to use these devices to make purchases. Money can be sent by entering information into a web form, by clicking buttons on an application, by scanning a Quick Response code, by bumping two phones together or in other ways.

The use of a connected device by an employee or agent to use corporate funds to make purchases on behalf of an organization can lead to a complicated reconciliation process. Checking the credit card bill every month may be tedious and error prone but more importantly it may discover errors too late in the process. The amount of time between the moment of purchase and the arrival of the bill creates uncertainty and allows a long lead time for abuse.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of creating a secure audit trail for transactions may include, by a host electronic device, for each of a plurality of transactions, receiving, from a client electronic device, a transaction details document that summarizes the transaction, generating a document hash by performing a first cryptographic hash function on the received transaction details document, and identifying metadata associated with the transaction. The method may include generating an entry hash associated with the plurality of transactions by performing a second cryptographic hash function on at least the document hash of each transaction in the plurality of transactions and the metadata associated with each transaction in the plurality of transactions, and storing the entry hash in an entry in a transaction log database.

In an embodiment, a system of creating a secure audit trail for transactions may include an electronic device and a computer-readable storage medium in communication with the electronic device. The computer-readable storage medium may include one or more programming instructions that, when executed, cause the electronic device to, for each of a plurality of transactions, receive, from a client electronic device, a transaction details document that summarizes the transaction, generate a document hash by performing a first cryptographic hash function on the received transaction details document, and identify metadata associated with the transaction. The computer-readable storage medium may include one or more programming instructions that, when executed, cause the electronic device to generate an entry hash associated with the plurality of transactions by performing a second cryptographic hash function on at least the document hash of each transaction in the plurality of transactions and the metadata associated with each transaction in the plurality of transactions, and store the entry hash in an entry in a transaction log database.

BRIEF DESCRIPTION OF THE DRAWINGS

FIG. 4 illustrates an example screen shot of an order summary according to an embodiment.

FIG. 6 illustrates example transaction metadata according to an embodiment.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

A "purchasing entity" refers to a company, business, or other organization on whose behalf a purchase is made or is attempted to be made using its funds.

A "transaction details document" refers to an electronic file containing information associated with a completed purchase or a potential purchase by a user.

A "user" refers to a person who makes or who attempts to make a purchase using funds of a purchasing entity.

Figure 1:
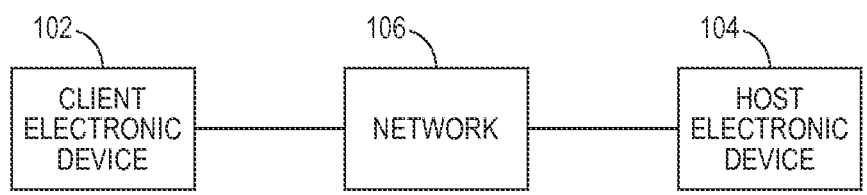
FIG. 1 illustrates an example system of creating a payment record with a cryptographically secure audit trail according to an embodiment.

FIG. 1 illustrates an example system of creating a payment record with a cryptographically secure audit trail according to an embodiment. As illustrated by FIG. 1, a system 100 may include a client electronic device 102 and a host electronic device 104 in communication with the client electronic device via a communication network 106. In an embodiment, a network 106 may be a local area network (LAN), a wide area network (WAN), a mobile or cellular communication network, an extranet, an intranet, the Internet and/or the like.

Figure 2:
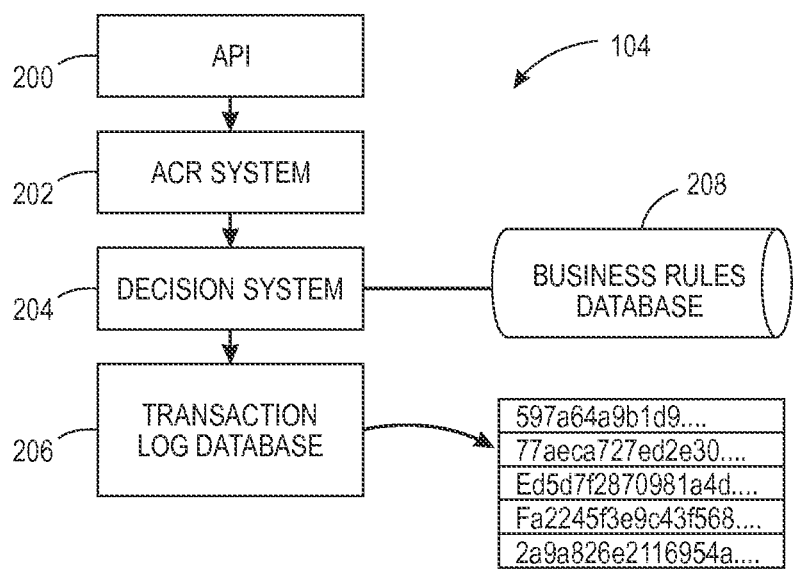
FIG. 2 illustrates example components of a host electronic device according to an embodiment.

FIG. 2 illustrates example components of a host electronic device according to an embodiment. As shown in FIG. 2, a host electronic device 104 may include a web services application programming interface (API) 200, an automated character recognition (ACR) system 202, a decision system 204, a transaction log database 206, and a business rules database 208. In an embodiment, a web services API 200 may receive purchase information from a client electronic device 104. An ACR system 202 may be a system, computing device or electronic device that is configured to perform the mechanical or electronic conversion of scanned or otherwise captured images of typewritten or printed text into machine-encoded/computer-readable text. An optical character recognition (OCR) system or an intelligent character recognition (ICR) system may be examples of ACR systems. An ACR system 202 may be used to perform electronic conversion of received purchase information in certain embodiments.

In an embodiment, a decision system 204 may determine whether one or more transactions are authorized. A transaction log database 206 may be a data structure, such as, for example, a list, table, or database, that includes one or more entries. Each entry may include information pertaining to one or more transactions as described in more detail below. A business rules database 208 may store information associated with one or more users and/or one or more rules pertaining to transaction authorization.

Figure 3:
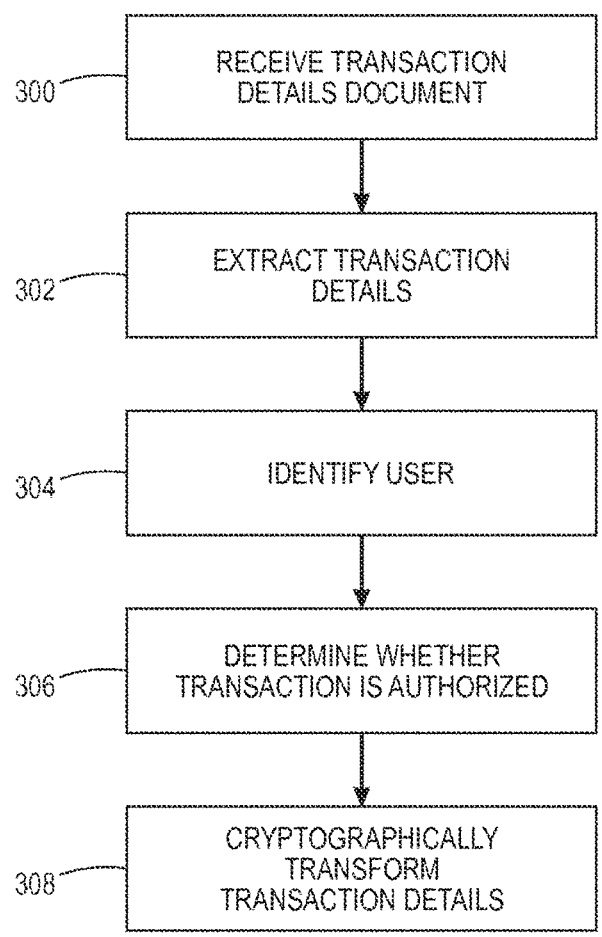
FIG. 3 illustrates a flow chart of an example method of creating a payment record with a cryptographically secure audit trail according to an embodiment.

FIG. 3 illustrates a flow chart of an example method of creating a payment record with a cryptographically secure audit trail according to an embodiment. As shown by FIG. 3, a transaction details document may be received 300 by a host electronic device from a client electronic device. As noted above, a transaction details document refers to an electronic file containing information associated with a completed purchase or a potential purchase by a user. The transaction details in the document are the specific parameters of the transaction. Example transaction details in a transaction details document may include a vendor identifier, a purchase amount, a purchased item or items, a purchased service or services, an amount of tax for the purchase, a user identifier, shipping or handling fees, other fees, and/or the like.

In certain embodiments, a client electronic device may capture a transaction details document by capturing a screen shot or other image of a transaction or order summary. FIG. 4 illustrates an example screen shot of an order summary according to an embodiment. In an embodiment, a client electronic device may capture a screen shot of a transaction or order summary, and may send the captured screen shot to a host electronic device as a transaction details document. For example, a captured screen shot may be included in an email that may be sent to a web service associated with a host electronic device.

Alternatively, a user of the client electronic device may select a button, menu, drop down, hot key or graphical user interface tool to activate a program that performs a screen capture and a client electronic device may automatically send it to a web service associated with a host electronic device. In other embodiments, transaction details may be captured in other formats such as, for example, portable document format documents (PDFs), text files, paper receipts, matrix barcodes such as, for example, Quick Response (QR) codes, two dimensional barcodes, Aztec codes, Data Matrix codes, DataGlyphs, Qodes, and PDF417 codes, and/or other documents. Copies and/or images may be sent to a web service associated with a host electronic device as transaction details documents. A client electronic device may send a captured transaction details document to a host electronic device, and the host electronic device may receive 300 the captured transaction details document.

In an embodiment, a host electronic device may extract 302 one or more of the transaction details from the received transaction details document. For example, a host electronic device may use optical character recognition, natural language processing, speech-to-text programs and/or the like to extract 302 one or more transaction details from a received transaction details document.

In certain embodiments, a host electronic device may identify 304 a user associated with the received transaction details. A host electronic device may identify 304 a user from one or more identifiers that are included in extracted transaction details. In other embodiments, a separate user identifier may be received by a host electronic device from a client electronic device. A user identifier may be a unique alphanumeric identifier of a user. Examples include, without limitation, a user's phone number, username, email address, or other identifier.

A host electronic device may determine 306 whether the transaction corresponding to the received transaction details document is authorized. A transaction may be authorized if it satisfies one or more business rules. Business rules may be one or more conditions that a host electronic device analyzes to determine whether a transaction is authorized. In certain embodiments, business rules may be specific to a purchasing entity. The business rules that apply may be based at least in part, on the received user identifier. For instance, a user identifier may indicate to a host electronic device a role associated with the user. Example roles may include, without limitation, employee, manager, senior manager and/or the like. Additional and/or alternate roles may be used within the scope of this disclosure.

In an embodiment, an authorized transaction amount may depend, at least in part, on the user's associated role. For example, a user may have authorization to make transactions for a certain authorization amount. An authorization amount refers to an upper threshold value of purchases that a user is authorized to make. For instance, an employee may have authorization to make purchases of an authorization amount that is $100 or less, managers may have authorization to make purchases of an authorization amount that is $500 or less, and senior managers may have authorization to make purchases of an authorization amount that is $1,000 or less. Additional and/or alternate transaction amount thresholds may be used within the scope of this disclosure. If a user attempts a transaction that exceeds the user's authorized limit, the transaction may be declined. Otherwise, it may be accepted.

In an embodiment, a host electronic device may maintain or may be in communication with a business rules database. The business rules data base may include information associated with one or more users. For instance, in the case of a company, a business rules database may include information about one or more of the company's employees, such as, for example, unique identifiers, names, titles, roles, and/or the like. Table 1 illustrates an example chart of user information that may be included in a business rules database according to an embodiment. In other embodiments, information such as that illustrated in Table 1, may be stored in a database or other storage outside of the business rules database, but accessible to the host electronic device. For example, the information illustrated in Table 1 may be stored in a user profile database.

TABLE 1

| Name | Unique Identifier | Role |
|---|---|---|
| John Smith | 1058391 | Employee |
| Cheryl Jones | 1240941 | Manager |
| Mike Williams | 1569842 | Senior Manager |

A business rules database may include information pertaining to one or more rules used to authorize transactions. For instance, a business rules database may include information about which user roles are authorized to conduct what monetary level of transactions. Table 2 illustrates an example chart of authorization information that may be included in a business rules database according to an embodiment.

TABLE 2

| Role | Authorized Amount |
|---|---|
| Employee | $100 or less |
| Manager | $500 or less |
| Senior Manager | $1,000 or less |

As such, in this example, a host electronic device may use a received user identifier to determine a role (or other information) associated with the user, and then may use the role (or other information) to determine whether the transaction is authorized.

In an embodiment, if a host electronic device declines a transaction, the transaction may still be processed by the corresponding financial institution such as, for example, a credit card company. But a user may be notified that the transaction is declined by the purchasing entity. For instance, a user may be an employee at Company A, and may attempt to make a $1,000 purchase with a Company A credit card. The purchase may be completed, but a host electronic device associated with Company A may determine that, because the transaction amount exceeds the employee's $100 limit, that the transaction is declined by Company A. As such, the employee may be notified that the employee is responsible for paying the $900 difference and will not be reimbursed by Company A.

In an embodiment, the transaction details and/or other information may be cryptographically transformed 308, and the result may be stored in a transaction log database. A transaction log database is a data structure having one or more entries that store data pertaining to one or more transactions. Entries in a transaction log database may be stored in a sequential or otherwise ordered manner. In an embodiment, each entry in a transaction log database may store cryptographically-transformed transaction details that are associated with a group of transactions. The group of transactions may include any number of transactions. An entry may also store cryptographically-transformed metadata associated with one or more transactions in a group of transactions.

Figure 5:
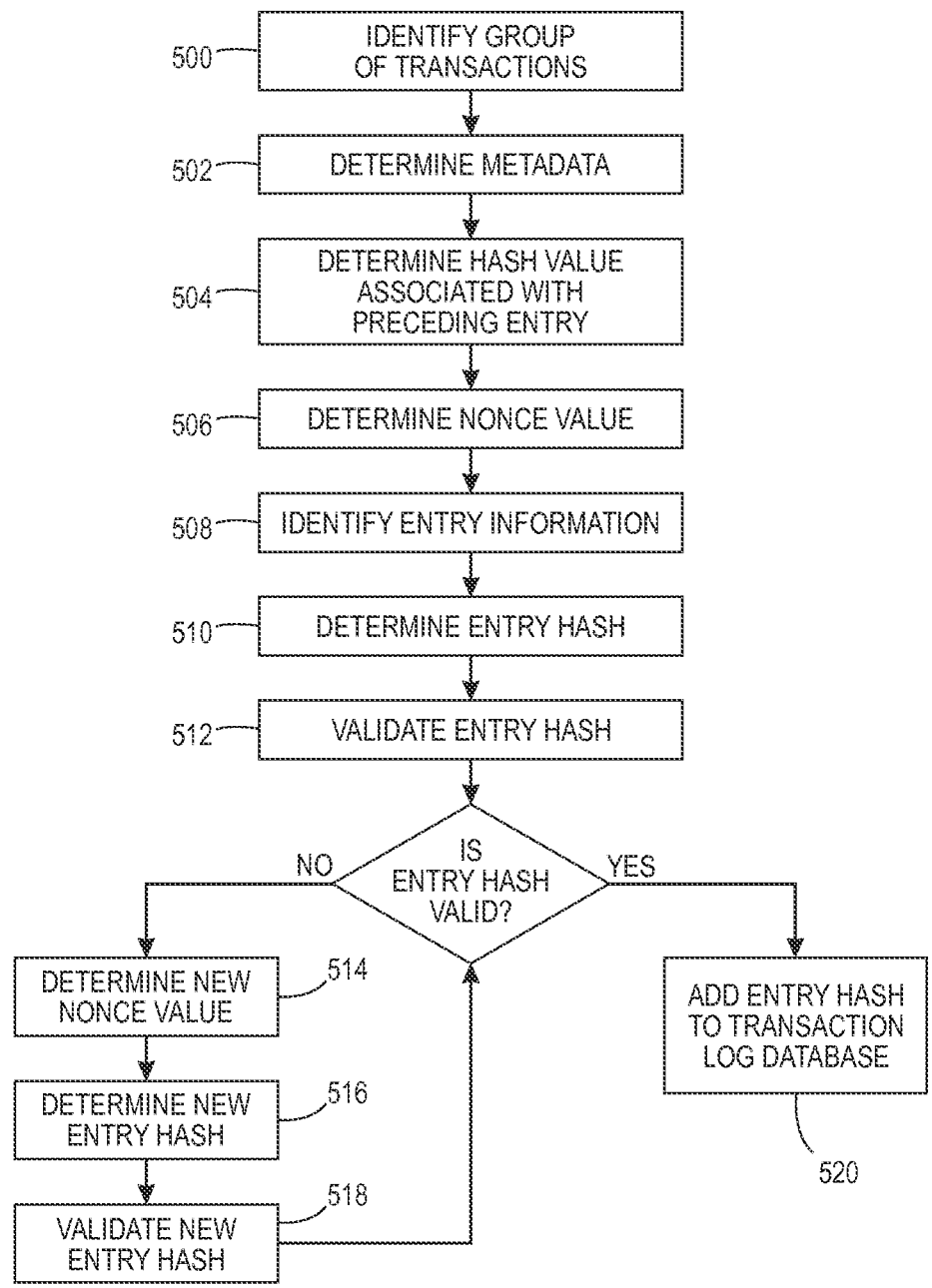
FIG. 5 illustrates a flow chart of an example method of adding an entry to a transaction log database according to an embodiment.

In various embodiments, transaction details may be cryptographically transformed 308 by adding an entry to a transaction log database. FIG. 5 illustrates a flow chart of an example method of adding an entry to a transaction log database according to an embodiment. As illustrated by FIG. 5, a group of transactions whose information is to be added to an entry may be identified 500. A group of transactions may be identified 500 based on a corresponding time of receipt for one or more transactions within the group. For example, a group of transactions may include 50 transactions, and groups of 50 transactions may be identified 500 based on the order in which they are received. In an alternate embodiment, a group of transactions may include information for a certain number of received transactions that are randomly or pseudo-randomly selected. Additional and/or alternate identification processes may be used within the scope of this disclosure.

As illustrated by FIG. 5, metadata associated with one or more of the transactions from the identified group may be determined 502. Metadata may include, without limitation, an amount of the transaction, a currency of the transaction, a vendor identifier, an indication as to whether the transaction was approved or denied, a user identifier, and/or the like. In an embodiment, a cryptographic hash of the transaction details document associated with one or more transactions of a group of transaction may be generated by performing a cryptographic hash function on transaction details document, and may be included in the metadata for the corresponding transaction. In an embodiment, any cryptographic hash function may be used. By including a cryptographic hash of the transaction details document in the metadata, attempts to alter or corrupt the transaction record by substituting different documentation may be defeated. FIG. 6 illustrates example transaction metadata according to an embodiment.

In an embodiment, if the entry that is to be added to the transaction log database is not the first entry in the database, a hash value associated with the immediately preceding entry in the transaction log database may be determined 504. A hash value associated with the immediately preceding entry in the transaction log database may be determined 504 by accessing the hash value from the corresponding entry of the transaction database.

As shown in FIG. 5, a nonce value may be determined 506. A nonce value is a value that is used in generating a cryptographic hash value. In certain embodiments, a nonce value may be randomly or pseudo-randomly generated.

In an embodiment, entry information for an entry may be identified 508. Entry information may include, for one or more transactions included in a group of transactions associated with the entry, the hash of the transaction details document for the transaction, metadata associated with the transaction, the determined nonce value, and/or the hash value associated with the immediately preceding entry in the transaction log database, to the extent there is one. An entry hash may be determined 510 by performing a cryptographic hash function on the identified entry information. In an embodiment, any cryptographic hash function may be used.

In various embodiments, a host electronic device may validate 512 an entry hash. A host electronic device may validate an entry hash by determining whether the entry hash is valid or invalid. An entry hash may be determined to be valid if it satisfies one or more requirements. A requirement may be a rule or other condition pertaining to a characteristic of a hash. In some embodiments, one or more requirements may relate to the security or complexity of the corresponding hash. Example requirements may include a threshold number of characters that a hash include, a threshold number of leading characters that a hash include, and/or the like. Additional and/or other requirements may be used within the scope of this disclosure.

If an entry hash does not satisfy one or more requirements, the entry hash may be determined to be invalid. If an entry hash is determined to be invalid, a new nonce value may be determined 514, a new entry hash may be determined 516 using the new nonce value, and the new entry hash may be validated 518. This process may be repeated until a valid entry hash is determined.

Once a valid entry hash is determined, the entry hash may be added to 520 and stored in an entry in a transaction log database. Since at least part of the data input for every entry (except the first) is the resultant cryptographic hash for the previous entry, this creates a chain. This means that in order to forge a transaction, not only must the entry holding it be recreated but all subsequent entries must have hashes recomputed to keep from breaking the chain. The more entries that are added after a transaction, the harder it may be to alter an entry. This creates a strong presumption of integrity of the chain as a whole which only increases over time.

The described system creates a record of proposed and completed transactions. This record can be queried in close to real time. In addition, the transaction database can be queried so transactions within it can be monitored and expenditures can be tracked. As such, a transaction database may be used to create a cryptographically secure log of transactions in order to create an audit trail of expenditures.

By including a user identifier and a transaction status (approved/denied) in transaction meta-data, a purchasing entity may also find red flags for user behavior. In addition, when the monthly statement comes from a payment vendor, such as a credit card company, items listed on the statement but not present in the transaction database may stand out as potentially abusive anomalies. Whether there is abuse or not, the data in the transaction database may help automate statement reconciliation.

In an embodiment, a second cycle of steps 300-308 may take place for a receipt for one or more transactions. For example, it is customary for to have a receipt issued for a transaction. A receipt may be sent to a host electronic device to be evaluated and be included in the transaction database. Whether or not a receipt is included in the transaction database may be a matter of business policy.

In various embodiments, the described payment record processes may operate across a peer-to-peer network. New transactions may be broadcast to the network, and one or more nodes in the network may use them to create entry hashes. The use of multiple nodes may help avoid any particularly long entry hash from slowing down a system, as another node may be able to find a quicker solution. This helps to keep the time to confirmation of transactions relatively constant. It also helps ensure that attempts to falsify transactions are caught by other nodes.

A system may increase its security by operating in a distributed manner. For example, at least a certain number of nodes in a network may need to agree to accept a new entry before it is permanently added to a transaction log database. For instance, three servers located at three different locations, such as, for example, branch offices, may operate as a peer-to-peer network. At least two of the servers may need to agree to accept a new entry before it is added to a transaction log database. If someone gains unauthorized access to one of the servers and uses it to try and forge transactions, the attempt will fail because the other two servers will flag the entry hashes as invalid. The strength of the protection increases as the number of nodes in the network increases.

Figure 7:
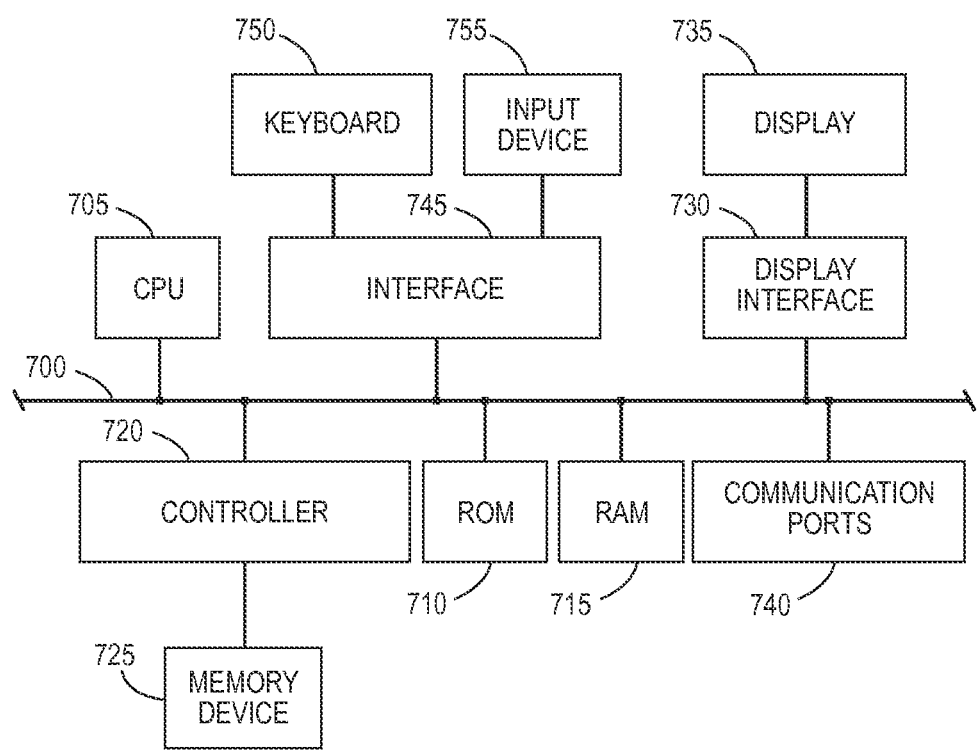
FIG. 7 illustrates a block diagram of example hardware that may be used to contain or implement program instructions according to an embodiment.

FIG. 7 depicts a block diagram of hardware that may be used to contain or implement program instructions. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an example of a production device, computing device or processor as such terms are used within this disclosure. Read only memory (ROM) 710 and random access memory (RAM) 715 constitute examples of non-transitory computer-readable storage media.

A controller 720 interfaces with one or more optional non-transitory computer-readable storage media 725 to the system bus 700. These storage media 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible, non-transitory computer-readable medium such as a compact disk, a digital disk, flash memory, a memory card, a USB drive, an optical disc storage medium and/or other recording medium.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of creating a secure audit trail for transactions, the method comprising, by a host electronic device:
   for each of a plurality of transactions:
      receiving, from a client electronic device, a transaction details document that summarizes the transaction, wherein the transaction represents a completed purchase or a potential purchase by a user,
      generating a document hash for the transaction by performing a first cryptographic hash function on the received transaction details document, and
      identifying metadata associated with the transaction;
   determining whether a transaction log database comprises at least one entry;
   in response to determining that the transaction log database comprises at least one entry, identifying a last entry hash associated with a last entry in the transaction log database, wherein the last entry hash represents an entry hash associated with a different plurality of transactions;
   identifying a nonce value;

generating an entry hash associated with the plurality of transactions by performing a second cryptographic hash function on the following:
the document hash of each transaction in the plurality of transactions,
the metadata associated with each transaction in the plurality of transactions,
the last entry hash, and
the nonce value;
storing the entry hash in an entry in the transaction log database;
querying the transaction log database to perform one or more of the following:
monitoring transactions and tracking expenditures,
finding red flags for user behavior,
automatic statement verification of a statement from a payment vendor,
identifying abusive anomalies in the statement from the payment vendor, or
identifying attempts to falsify transactions in a peer-to-peer network.

2. The method of claim 1, wherein receiving a transaction details document that summarizes a transaction by a user comprises receiving a screen capture of a transaction order summary.

3. The method of claim 1, further comprising:
extracting one or more transactions details from the received transaction details document;
receiving a user identifier associated with a user who performed the transaction; using at least a portion of the extracted transaction details and the user identifier to determine whether the transaction satisfies one or more business rules; and
including an indication of whether the transaction satisfies one or more business rules in the metadata for the transaction.

4. The method of claim 3, wherein extracting one or more transactions detail from the received transaction details document comprises using one or more of the following:
optical character recognition;
automated character recognition;
natural language processing; and
speech-to-text processing.

5. The method of claim 1, further comprising validating the entry hash by determining whether it satisfies one or more requirements.

6. The method of claim 5, further comprising, in response to determining that the entry hash does not satisfy one or more requirements:
generating a new nonce value;
generating a new entry hash using the new nonce value; and
validating the new entry hash.

7. The method of claim 1, wherein:
the transaction log database comprises a sequence of entries; and
storing the entry hash in an entry in a transaction log database comprises storing the entry hash in a next entry in the sequence.

8. A system of creating a secure audit trail for transactions, the system comprising,
an electronic device; and
a non-transitory computer-readable storage medium in communication with the electronic device, wherein the non-transitory computer-readable storage medium comprises one or more programming instructions that, when executed, cause the electronic device to:
for each of a plurality of transactions:
receive, from a client electronic device, a transaction details document that summarizes the transaction, wherein the transaction represents a completed purchase or a potential purchase by a user,
generate a document hash for the transaction by performing a first cryptographic hash function on the received transaction details document, and
identify metadata associated with the transaction,
determine whether a transaction log database comprises at least one entry,
in response to determining that the transaction log database comprises at least one entry, identify a last entry hash associated with a last entry in the transaction log database, wherein the last entry hash represents an entry hash associated with a different plurality of transactions,
identify a nonce value,
generate an entry hash associated with the plurality of transactions by performing a second cryptographic hash function on the following:
the document hash of each transaction in the plurality of transactions,
the metadata associated with each transaction in the plurality of transactions,
the last entry hash, and
the nonce value, and
store the entry hash in an entry in the transaction log database;
querying the transaction log database to perform one or more of the following:
monitoring transactions and tracking expenditures,
finding red flags for user behavior,
automatic statement verification of a statement from a payment vendor,
identifying abusive anomalies in the statement from the payment vendor, or
identifying attempts to falsify transactions in a peer-to-peer network.

9. The system of claim 8, wherein the one or more programming instructions that, when executed, cause the electronic device to receive a transaction details document that summarizes a transaction by a user comprise one or more programming instructions that, when executed, cause the electronic device to receive a screen capture of a transaction order summary.

10. The system of claim 8, wherein the non-transitory computer-readable storage medium further comprises one or more programming instructions that, when executed, cause the electronic device to:
extract one or more transaction details from the received transaction details document,
receive a user identifier associated with a user who performed the transaction,
use at least a portion of the extracted transaction details and the user identifier to determine whether the transaction satisfies one or more business rules; and
include an indication of whether the transaction satisfies one or more business rules in the metadata for the transaction.

11. The system of claim 10, wherein the one or more programming instructions that, when executed, cause the electronic device to extract one or more transaction details from the received transaction details document comprise one or more programming instructions that, when executed, cause the electronic device to use one or more of the following:

optical character recognition;
automated character recognition;
natural language processing; and
speech-to-text processing.

12. The system of claim 8, wherein the non-transitory computer-readable storage medium further comprises one or more programming instructions that, when executed, cause the electronic device to validate the entry hash by determining whether it satisfies one or more requirements.

13. The system of claim 12, wherein the non-transitory computer-readable storage medium further comprises one or more programming instructions that, when executed, cause the electronic device to, in response to determining that the entry hash does not satisfy one or more requirements:
  generate a new nonce value;
  generate a new entry hash using the new nonce value; and
  validate the new entry hash.

14. The system of claim 8, wherein:
  the transaction log database comprises a sequence of entries; and
  the one or more programming instructions that, when executed, cause the electronic device to store the entry hash in an entry in a transaction log database comprise one or more programming instructions that, when executed, cause the electronic device to store the entry hash in a next entry in the sequence.

* * * * *